Sept. 2, 1941. W. H. HUTCHINS 2,254,484
TEMPERATURE RESPONSIVE CONTROL
Filed Feb. 26, 1937 4 Sheets-Sheet 1
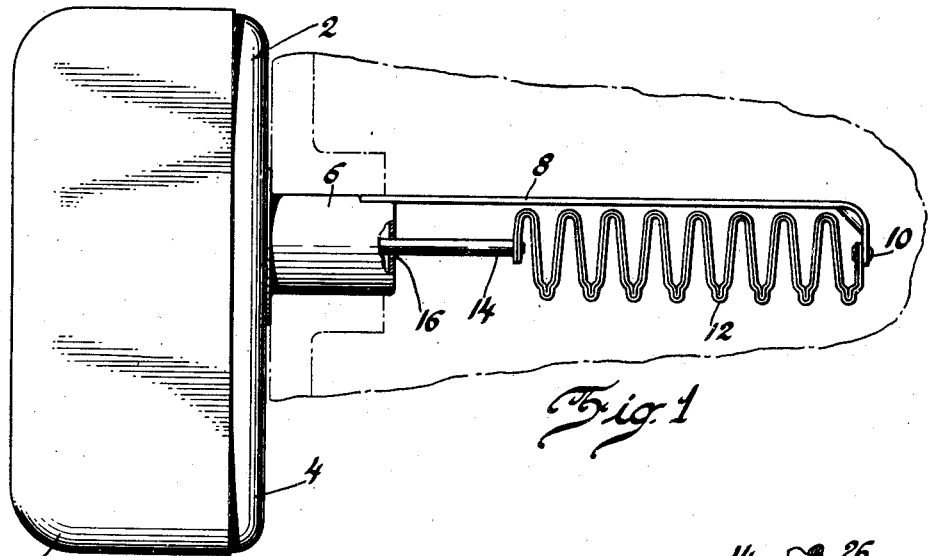
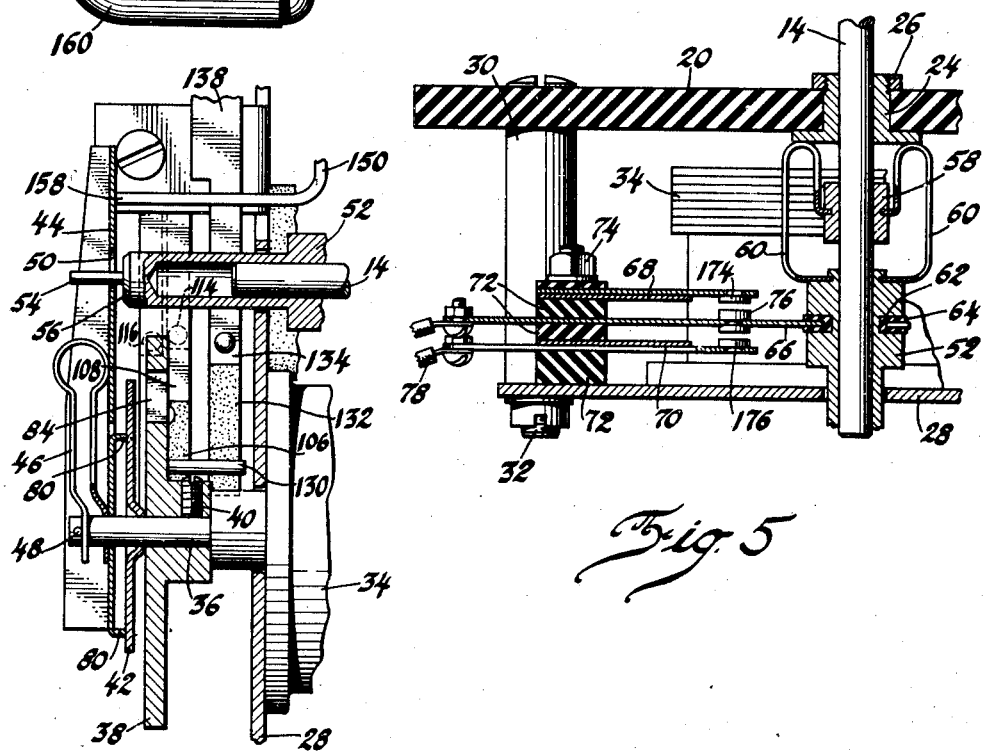
Inventor
William H. Hutchins
By Blackmore, Spencer & Flint
Attorneys

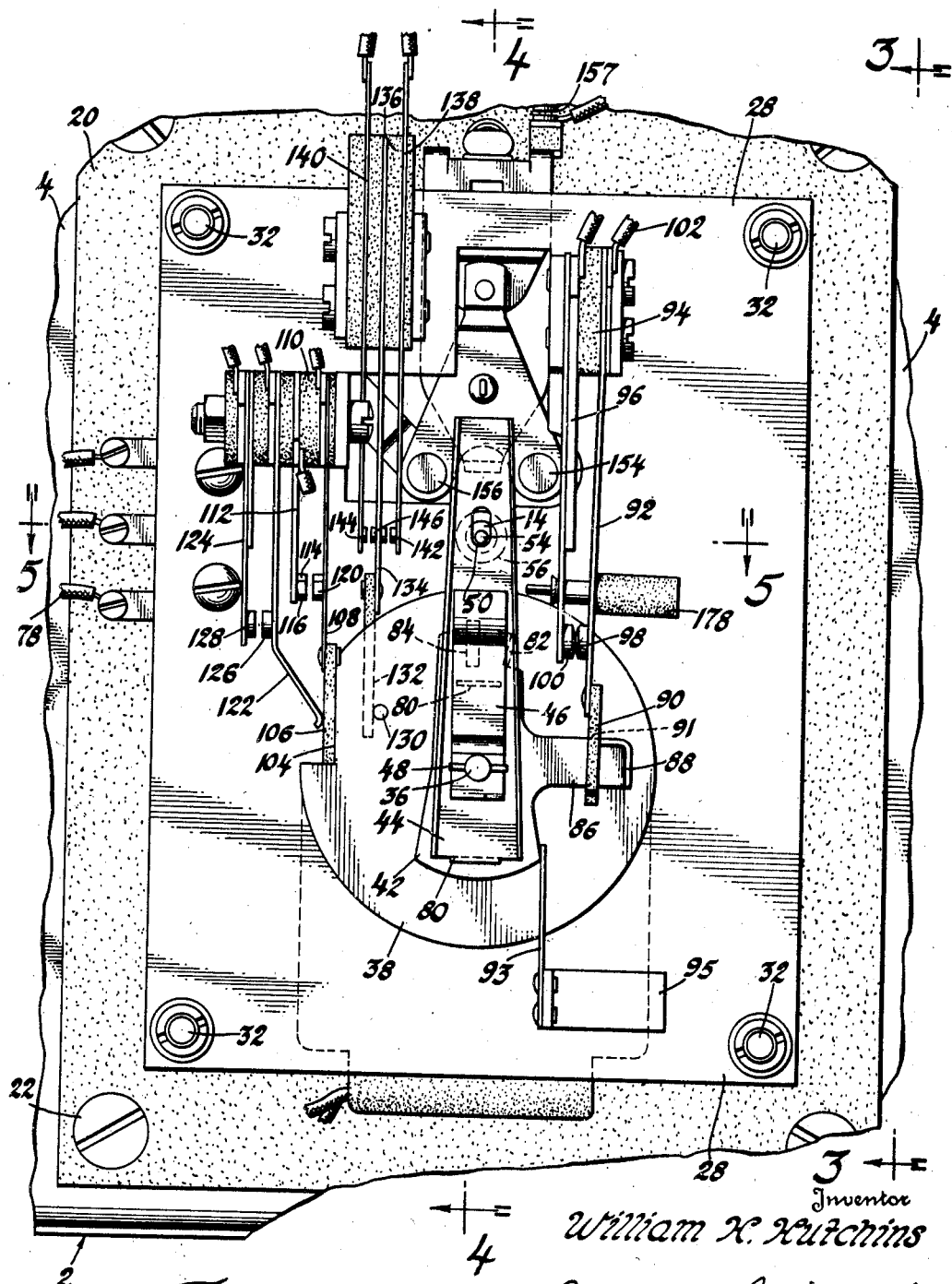

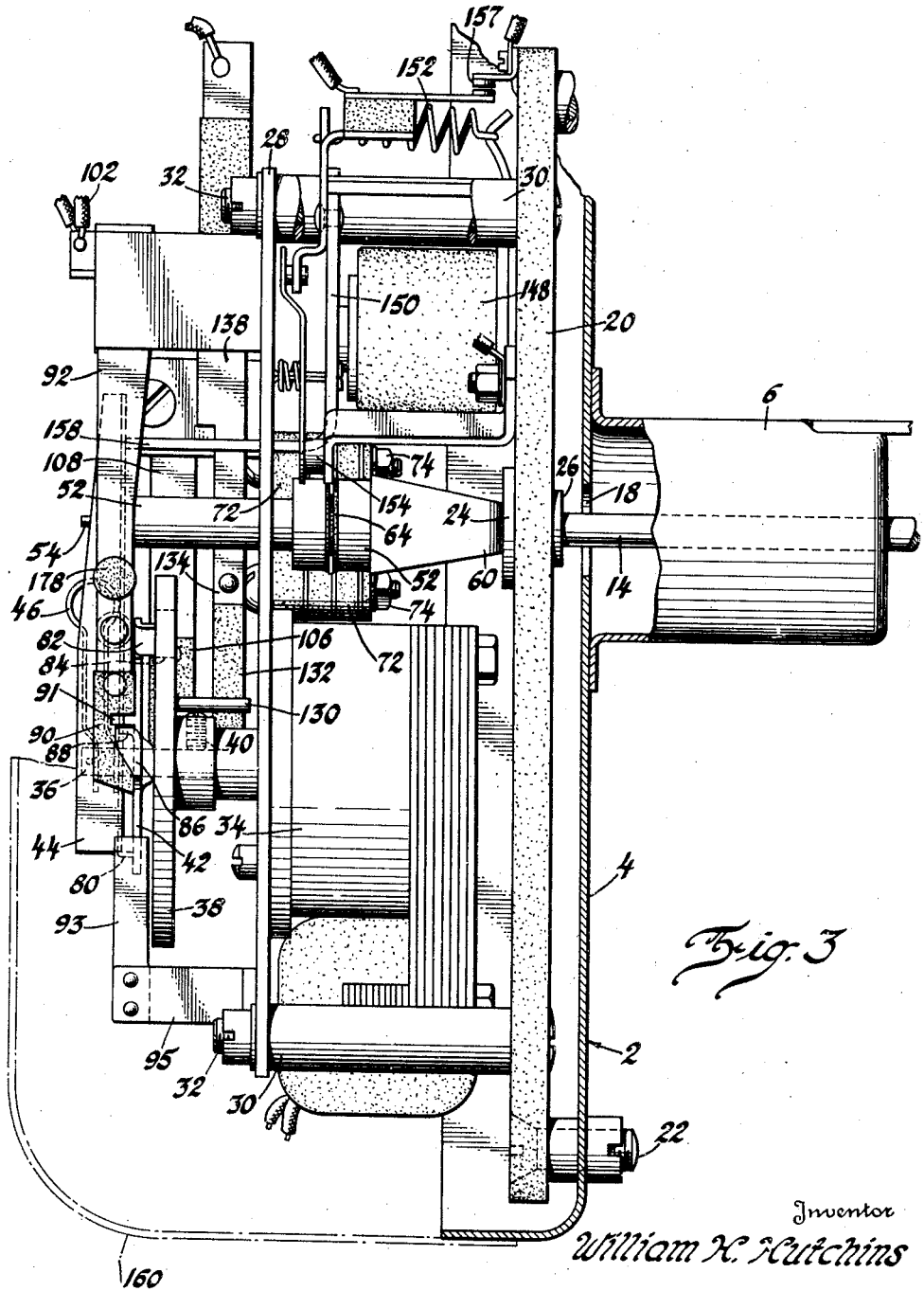

Patented Sept. 2, 1941

2,254,484

UNITED STATES PATENT OFFICE 2,254,484

TEMPERATURE RESPONSIVE CONTROL

William H. Hutchins, Rochester, N. Y., assignor to General Motors Corporation, Detroit, Mich., a corporation of Delaware Application February 26, 1937, Serial No. 127,819

2 Claims. (Cl. 200—138)

This invention relates to control apparatus and more specifically to apparatus for controlling a fluid fuel supply device such as, for example, an oil burner.

In the normal operation of an automatic heating plant of any type it is of course essential to have some automatic control within the space to be supplied with heat which broadly opens and closes a circuit to the means supplying fuel to a combustion chamber as the necessity for heat arises and is then supplied.

With the different types of fuel feeding devices it is also necessary to include in this general control various safety means which take care of any abnormal operation of the system due to various factors.

The normal operation as outlined above would be for the fuel supplying device to start supplying heat to the combustion chamber for a desired time and then stop. However there may be some reason why the device does not commence to burn and in this case it is not desirable to force fuel into the combustion chamber if the same is not burning as it will merely tend to collect in pools in the case of fluid fuel or in a mass in the case of solid fuel. It is therefore necessary to provide some means for only maintaining the fuel supply means in operation for a predetermined period if it does not start.

There is also the case of the flame failure for some reason or another in the case of fluid fuel burners after the burner has ignited and is operating normally. In this condition some safety means must be supplied. A second case is that of a momentary current failure either during the starting period or as the burner is in normal operation and there should be some safety means to prevent an explosion following a momentary current failure which would of course extinguish the flame.

It is therefore an object of my invention to provide a control for fluid fuel burners which includes and embodies the necessary control and safety factors as outlined above.

It is a further object of my invention to provide a compact and rugged master control to be utilized in this type of control system.

With these and other objects in view the embodiments of my invention are described in the following specification and claims and illustrated in the accompanying drawings, in which;

Figure 1 is a side elevation of the master control of my invention.

Figure 2 is an enlarged end elevation of the control, a portion being broken away.

Figure 3 is a sectional view taken on line 3—3 of Figure 2.

Figure 6:
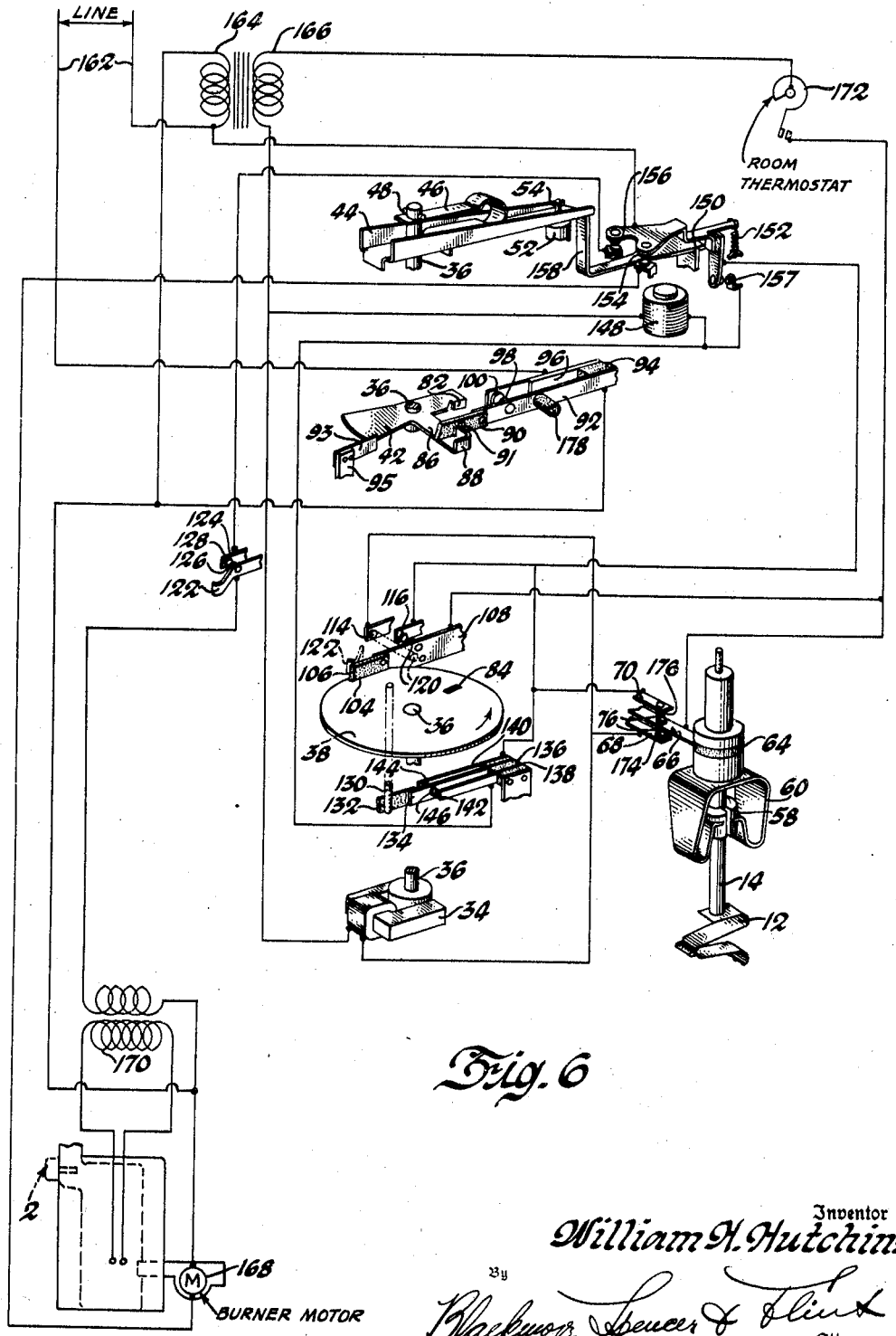

Figures 4 and 5 are sectional views taken partially on lines 4—4 and 5—5 respectively of Figure 2.

Figure 6 is a diagrammatic view of the control circuit to which the master control shown in the drawings is connected for motor operation.

The master control designated generally at 2 is composed of a flanged plate 4 which may be termed the backing plate to which is secured adjacent the central portion a hollow cylindrical member 6 the ends of which are flattened radially to lie adjacent the plate 4 and are secured thereto by riveting or other suitable means. The cylindrical member 6 has welded thereto a flat bar 8 which extends outwardly from the plate at right angles and has an end portion 10 bent at a right angle thereto and supporting one end of a compound bimetallic member 12 the opposite end of which is supported on a rod 14 longitudinally movable through an opening 16 in the end of the cylindrical member 6 and also through an opening 18 in the plate 4. Therefore as the heat applied to the bimetallic member 12 changes, it will cause the rod 14 to move in either direction longitudinally.

Supported on the opposite face of the flanged plate 4 is an insulating plate 20 secured to the flanged plate 4 by suitable spacing screws 22, said plate having adjacent its center a circular opening within which is secured a bushing 24 having a shoulder fitting snugly on the plate on one side and being externally threaded for a supporting nut 26 on the opposite side and through said bushing the rod 14 projects to operate various mechanism carried on the plate.

Secured in parallel spaced relation with the insulating plate 20 is a second plate 28 which is held in its proper spaced position by suitable spacing elements 30 and bolts 32. Between the two plates and secured rigidly to the upper or outer plate 28 is a small motor 34 which may be of the synchronous type. The rotatable shaft 36 of the motor projects through the plate 28 and has rigidly secured thereto for rotation a cam disk 38 by a set screw 40. Mounted on the shaft above the same disk is a member 42 of roughly bell crank outline, said member being loosely mounted thereon and not ordinarily rotating with the shaft. Lastly mounted on the end of the shaft is a long channelled lever 44 which is also loosely mounted but which is retained in its proper position by a spring member 46 and a pin 48 through the shaft. This disk 38 serves as the sequence control of the operation of the device and may be referred to as a program of the operation.

The long channelled lever 44 extends beyond the periphery of the disk 38 and has an opening 50 in the base adjacent its outer end which lies in alignment with the opening through which the rod 14 projects. A hollow sleeve 52 encases the outer end of the rod 14 and forms a bushing for the same in the plate 28, said sleeve extending through and terminating in a pin 54 which extends through the opening 50 in the channelled member 44 which maintains the channelled member above the end of the member 52 but permits the shoulder 56 on the same to abut the lower surface of the member 44 and to raise it upon longitudinal movement of the shaft 14. The sleeve member 52 fits the shaft 14 loosely so that there may be relative motion between the two. A split member 58 encompasses the shaft 14 below the member 52 and there are provided a plurality of spring members 60 which are connected to the inner end of the member 52 and tend to press the split member 58 against the rod 14 in such a manner as to cause a friction drive so that under normal conditions the split member 58 and the connected sleeve 52 will move with longitudinal movement of the shaft 14 but when a..y abutment is reached, such as the shoulder on the member 52 contacting the plate 28, there may be relative movement between the shaft 14 and the member 58 and sleeve 52 to prevent destruction or distortion of the apparatus.

In the sleeve 52 and below the plate 28 there is cut a circular groove 62 within which lies an insulating member 64 and in the latter is embedded one end of a contact arm 66 the opposite end of said arm being supported and spaced from two stationary contacts 68 and 70 by insulating block 72 on a bolted support 74. The stationary arms 68 and 70 carry contact points 174 and 176, respectively, which engage with a pair of movable contact points 76 on the arm 66 so that as the sleeve 52 moves back and forth longitudinally with movement of the shaft 14, it closes either the upper or the lower contacts as viewed in Figure 5. These stacks of stationary and movable contacts are conventional and similar to the type used in telephone installations and are connected into their various circuits by suitable connections to cables such as 78.

As above mentioned, the pin 54 on the end of the sleeve 52 extends through an opening 50 in the angular member 44, the latter member overlying the member 42 and having two pressed out tips 80 at diametrically opposite points and directed downwardly to contact the upper surface of the disk 42 so that the two, that is, the member 44 and the member 42, lie parallel. Also bent downwardly from the face to project from the surface of the member 42 is an extending tip 82 which under normal circumstances lies adjacent the upper face of the disk 38 and which may under certain circumstances engage in a slot 84 provided in the disk.

One arm of the member 42 extends to one side as shown at 86 and has a raised flange 88 on the outer end which is adapted to contact the insulated end 90 of an arm 92, the opposite end of which is rigidly connected in an insulating block 94 which also supports a substantially stationary arm 96. The insulated end 90 has a slot 91 therein which will allow one portion of the flange 88 to pass thereinto when the arm 86 moves in a counterclockwise direction as shown in Figure 2. This will allow the arm 92 to move outwardly to the right but only until the end 90 contacts the remainder of the flange 88 which is at right angles to the portion extending through the opening 91 and thus acts as a stop.

A spring bar 93, anchored to the frame by a bracket 95, bears against the member 42 to bias it to a position normally allowing the safety switch to close. The arms 92 and 96 carry contacts 98 and 100 respectively and the opposite ends of the arms are connected to suitable cables in the circuit as shown at 102. These two contacts provide a safety switch which is opened by outward movement of arm 92 and their operation will be later described.

The general outline of the disk 38 is provided with a notch 104 which is also an index for the starting position of the disk. In this notch 104 in the deenergized position is the insulated end 106 of a movable arm 108 which is supported in an insulated block assembly 110 which also supports a substantially stationary arm 112 having thereon two separate contacts 114 and 116 which engage with a pair of contacts 120, the latter not being insulated from each other on the arm 108. Also supported in the insulating block 110 is a movable arm 122 and a stationary arm 124 carrying thereon contacts 126 and 128, the end of the arm 122 bearing down upon the insulating block 106 so that the same is also moved when the disk 38 begins to rotate. The contacts 128 and 126 provide the ignition switch and contacts 114, 116 and 120 provide a cammed interlocking switch with the stack switch.

Projecting from the lower surface of the disk 38 is a pin 130 which at one period of its rotation is adapted to contact with the insulating end 132 of the movable arm 134 supported in an insulating block assembly 136 between two substantially stationary arms 138 and 140, each of the outer arms carrying contacts 142 and 144 respectively to engage with opposite contacts 146 on the movable arm 134. The object of this switch is to provide only momentary contact between points 142—144, movable contacts 146 being merely to form a momentary contact between the other two when vibrating due to release by the pin. The contacts 146 are not connected into any circuit. Both of the insulating blocks 110 and 136 are supported in any suitable manner on the upper or outer face of the plate 28.

Mounted between the plate 28 and insulating plate 20 at the opposite end from the motor 34 is a relay coil 148 and directly over the core of the relay is a movable armature 150 spring biased by spring 152 to open position and which when energized closes its two contacts 154 and 156 and at the same time allows holding contacts 157 to close. There is also an extension 158 upon the armature which extends up to and supports the lower surface of the angular member 44 so that when the relay is deenergized this arm 158 will support the member 44 in parallelism with the member 42 and the disk 38. However, when the relay is energized to close its contacts, this support is withdrawn for a purpose to be described.

The device so far described is what is normally termed a master control and is adapted to be applied in a position whereby the bimetallic element such as shown at 12 is adapted to project within the furnace so that the heat of combustion may be applied thereto. The backing plate 4 supports a cover 160 which will enclose the apparatus and prevent dirt, etc., from clogging the operation.

The operation of this device in the circuit such as that shown in Figure 6 will be best understood by referring to the wiring diagram in which are shown diagrammatically the other necessary items to complete operation. A supply 162 is provided which supplies the primary 164 of a transformer, the secondary 166 of which supplies the main portion of the control circuit. Directly connected across the supply line 162 is a burner motor at 168 having in series therewith a motor switch 154. Also directly across the line and in parallel with the motor circuit is an ignition circuit including the ignition transformer 170, a pair of relay contacts 156 and a pair of ignition contacts 126 and 128.

In the low voltage circuit and in series with the secondary 166 of the transformer there is a room thermostat 172 and the stack switch movable contact 76 which cooperates with either stationary contact 174 or 176. In series with the stack switch contact 174 is the timing motor 34 and in series with the hot contact 176 is the momentary contact 134 and the contact 116 which is operated by the camming movement of the rotated disk in cooperation with the movable contact 120. Also in series with the cold contact 174 of the stack switch is the contact 114 which also cooperates with the movable contact 120 of the camming disk.

Connected between the secondary and the momentary contact switch 134 is the relay 148 and in series with the momentary contact 134 and the contact 116 are holding contacts 157 for the relay 148. Also connected in the main line ahead of the transformer 164 are safety switch contacts 98 and 100 which upon opening cause the whole system to be deenergized.

The operation of the system therefore is as follows: The safety switch contacts 98 and 100 are normally closed so that the transformer 164 is energized and with the stack in its cold position so that contacts 76 and 174 engage, when the room thermostat 172 closes its circuit a timing motor is energized through an obvious circuit as follows: Secondary 166, room thermostat 172, contacts 76—174, timing motor 34 and secondary 166. This causes the control motor motor to start in operation and therefore the disk 38 rotates in a counterclockwise direction as viewed in Figure 2 which, due to the camming action of the notch 104, presses the insulating block 106 out to the left and closes the ignition contacts 126 and 128 and also presses the movable contact 120 against both contacts 114 and 116.

As noted hereabove, the timing motor 34 is initially energized on closure of the room thermostat 172 through the contacts 76 and 174 of the stack switch which are closed when the stack is cold. As soon as the timing motor starts, the rotation of the disk 38 closes contacts 120 and 114 by the cam operation of block 106 which establishes a further circuit from the room thermostat to the timing motor to sustain the energization thereof after the stack switch contacts 76 and 174 open on establishment of combustion for one revolution when the block 106 falls into the notch 104 and contact 120 moves away from contact 114.

At the same instant the pin 130 forces the arm 132 to the left and then as it passes the tip 132 springs back and is designed so as to cause a momentary circuit from contact 144 through contact 146 to contact 142 so that the relay may be momentarily energized through the following circuit: 166, 172, 120, 116, 140, 144, 146, 142, 148 and back to the secondary 166. As the relay snaps in it closes its own holding contact 157 and therefore remains energized as long as the room thermostat 172 calls for heat, if, of course, the normal sequence is maintained with regard to the operation. It also closes two sets of contacts 154 which close the motor circuit and allow the motor to discharge oil into the combustion chamber and also the closure of the contacts 156 closes the ignition circuit so that at the same time a spark is provided to ignite the fuel.

The device therefore continues to operate in what may be termed the initial or instigating stage and the disk 38 proceeds to rotate but it is to be noted that with the energization of the relay 148 the arm 158 has been withdrawn from supporting the channelled member 44 and therefore this member presses against the member 42 through the two bent down tips 80 which press inwardly in turn on the face of the disk 38 and exert this pressure on the downwardly bent portion 82. As the furnace heats normally the rod 14 will be caused to move inwardly and the shoulder 56 on the sleeve 52 will abut the lower surface of the member 44 and lift it relieving the inward pressure of the member 82 on the disk 38 so that as the slot 84 rotates past the position of the member 82 this projecting member will not be forced into the slot and the disk 38 may continue to rotate to its normal stopping position which is at the end of 360°.

If, however, the furnace has not heated through some fault, the projection 82 will extend into the opening 84 due to the fact that the elongated or over-balanced member 44 presses downwardly on that portion of the member 42 to so force it in and thereafter the member 42 will rotate with the disk 38 which will of course cause it to turn the arm 86 whose flange 88 will pull the end of the lever 92 in a counterclockwise direction to trip into opening 91 to break the safety switch contacts. This will of course deenergize the whole system and necessitate manual reset by button 178. If, however, the furnace has ignited, as above stated, the disk 38 will rotate through to the end of its 360° and the relay will then be maintained operative alone through a circuit as follows: 166, 172, 76, 176, 157, 148 back to 166.

When a sufficient amount of heat has been supplied to the location to be heated the thermostat 172 will open this circuit and cause a deenergization of the device. If the device is in operation under normal conditions and there is a momentary current failure, the switch points 157 which are holding contacts and operated by the relay, will open and the relay cannot be again reenergized until the mechanism goes through its original cycle. This is also true in case of flame failure when the device is operating normally but in this case the running circuit for the relay is broken at contacts 76 and 176 rather than at contact 157.

I claim:

1. In a control, a support, a plurality of switches located thereon, rotatable means for operating a portion of the switches, relay means for operating a further portion, temperature responsive means for operating the remainder and separate mechanical interlocking means between the relay and temperature responsive means and one of the switches to alter and affect the operation of said last named switch by the rotatable means.

2. In a master control for a fluid fuel burner, a support, a timed switch mounted thereon, rotatable means operating said switch, a safety switch, means operated by the rotatable means for operating the safety switch, temperature responsive means contacting the last mentioned means for controlling safety switch operation, a relay on said support, an armature attractible thereby, said armature having an extension engaging the safety switch operating means to control in combination with the temperature responsive means the action of the safety switch.

WILLIAM H. HUTCHINS.